US012586354B2

(12) United States Patent
Nakai

(10) Patent No.: US 12,586,354 B2
(45) Date of Patent: Mar. 24, 2026

(54) TRAINING METHOD, APPARATUS AND NON-TRANSITORY COMPUTER READABLE MEDIUM FOR A MACHINE LEARNING MODEL

(71) Applicant: KABUSHIKI KAISHA TOSHIBA, Tokyo (JP)

(72) Inventor: Tomohiro Nakai, Kawasaki (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 220 days.

(21) Appl. No.: 18/484,909

(22) Filed: Oct. 11, 2023

(65) Prior Publication Data

US 2024/0290074 A1 Aug. 29, 2024

(30) Foreign Application Priority Data

Feb. 24, 2023 (JP) ................................. 2023-027557

(51) Int. Cl.
*G06V 10/771* (2022.01)
*G06T 7/00* (2017.01)
*G06V 10/764* (2022.01)

(52) U.S. Cl.
CPC .......... *G06V 10/771* (2022.01); *G06T 7/0008* (2013.01); *G06V 10/764* (2022.01)

(58) Field of Classification Search
None
See application file for complete search history.

(56) References Cited

U.S. PATENT DOCUMENTS

2023/0290516 A1* 9/2023 Matthews .............. G16H 50/70
2024/0290074 A1* 8/2024 Nakai .................... G06V 10/82

FOREIGN PATENT DOCUMENTS

JP          2022-3495 A       1/2022
WO      WO 2022/185432 A1      9/2022

OTHER PUBLICATIONS

Venkataramanan, S., et al. (2020). Attention Guided Anomaly Localization in Images. In: Vedaldi, A., Bischof, H., Brox, T., Frahm, JM. (eds) Computer Vision—ECCV 2020. ECCV 2020. Lecture Notes in Computer Science(), vol. 12362. Springer, Cham. https://doi.org/10.1007/978-3-030-58520-4_29 (Year: 2020).*
Shashanka Venkataramanan et al., "Attention Guided Anomaly Localization in Images," arXiv: 1911.00861v4, 19 pages (2020).
Japan Patent Office, Office Action in JP App. No. 2023-027557 (Dec. 2, 2025).

* cited by examiner

*Primary Examiner* — Tahmina N Ansari
(74) *Attorney, Agent, or Firm* — Finnegan, Henderson, Farabow, Garrett & Dunner, LLP

(57) ABSTRACT

According to one embodiment, a training method computes a first feature map and a first attention map from a first image, and computes a second feature map and a second attention map from a second image, by inputting the first image, which does not include a defective area of a target, and the second image, which includes the defective area of the target, to a machine learning model. The training method computes a first loss, based on the first attention map. The training method computes a class classification of the target, based on the second feature map and the second attention map. The training method computes a second loss, based on the class classification. The training method computes a total loss, based on the first loss and the second loss. The training method updates a parameter of the machine learning model so as to minimize the total loss.

5 Claims, 5 Drawing Sheets

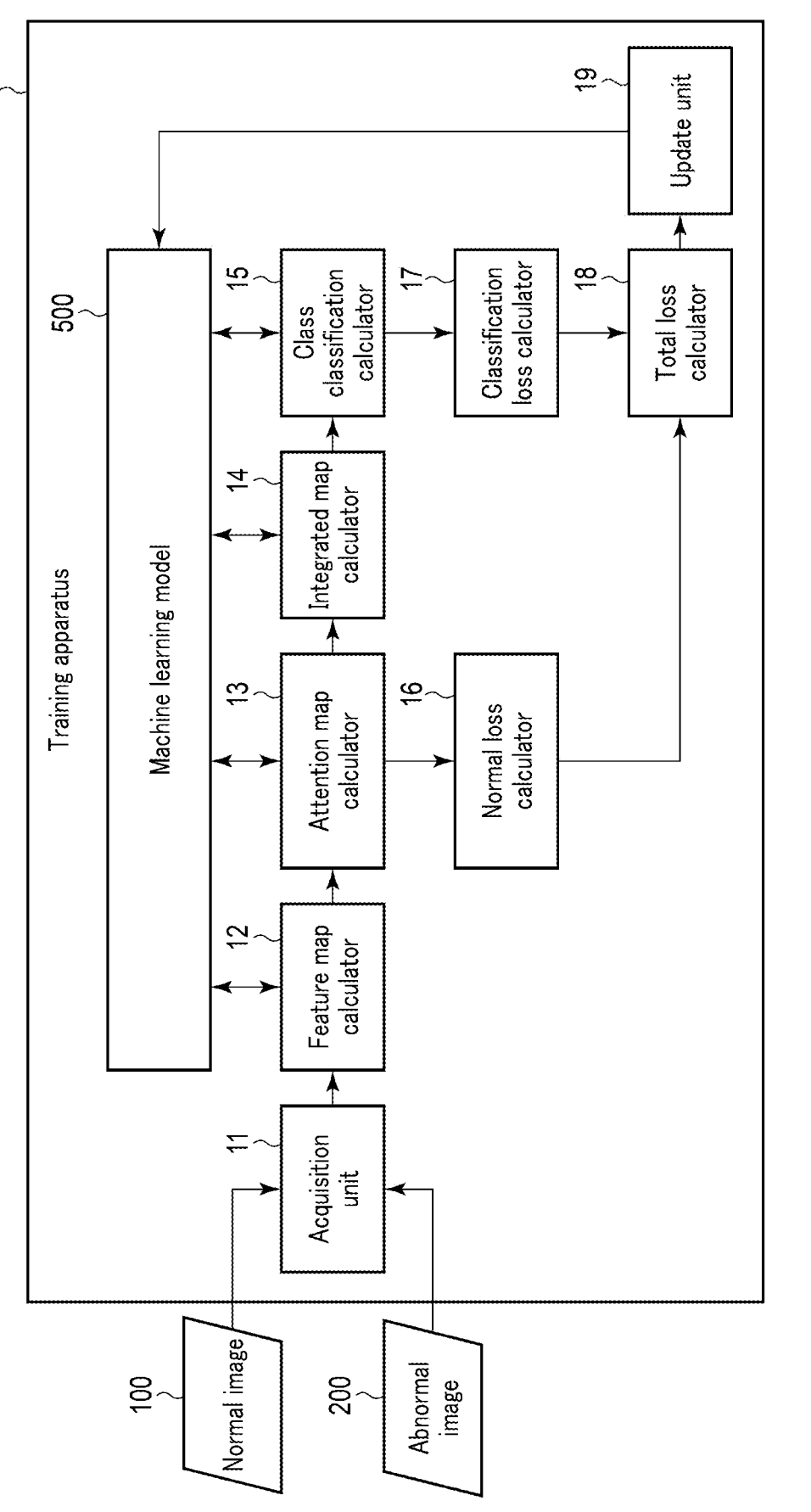
F I G. 1

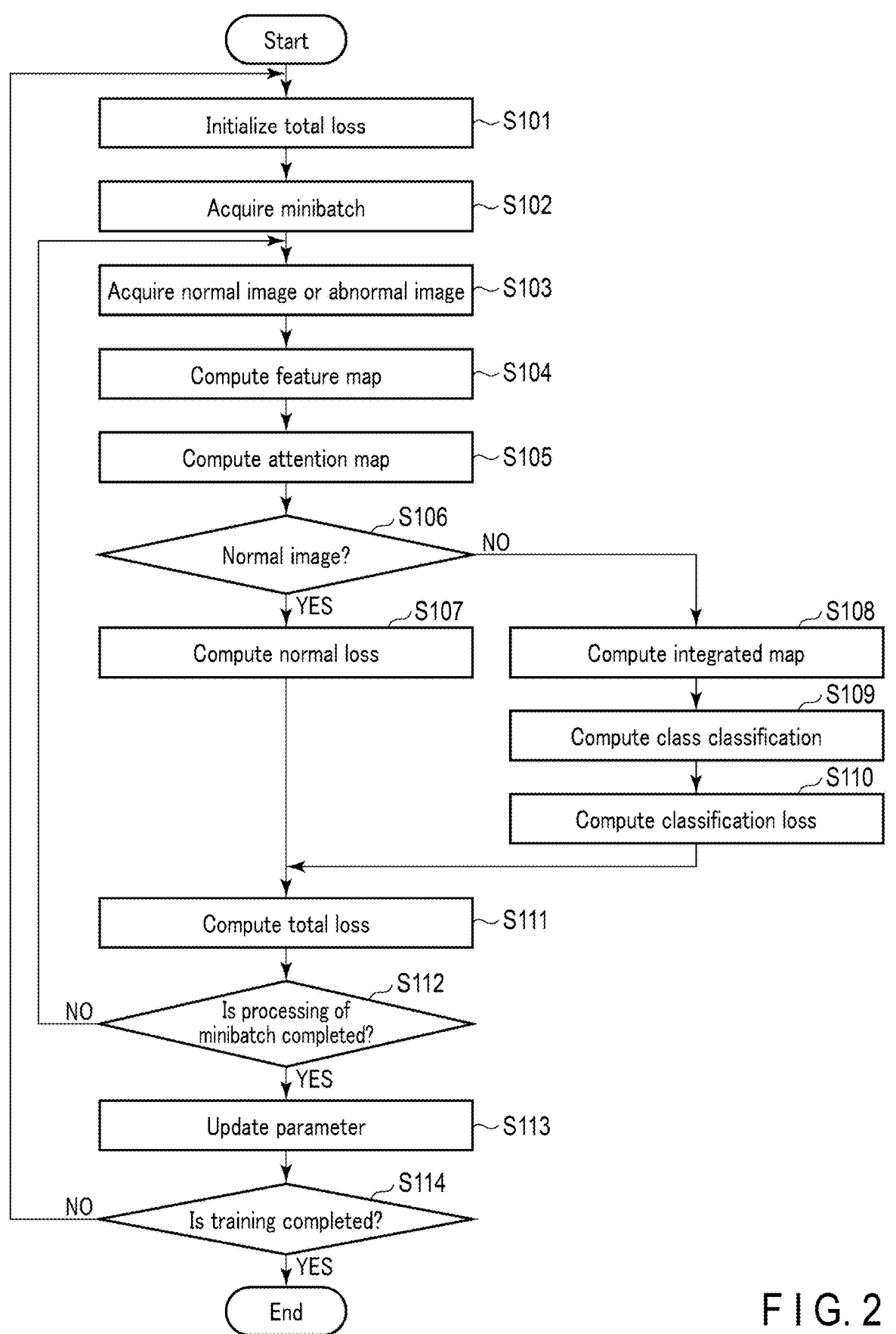
F I G. 2

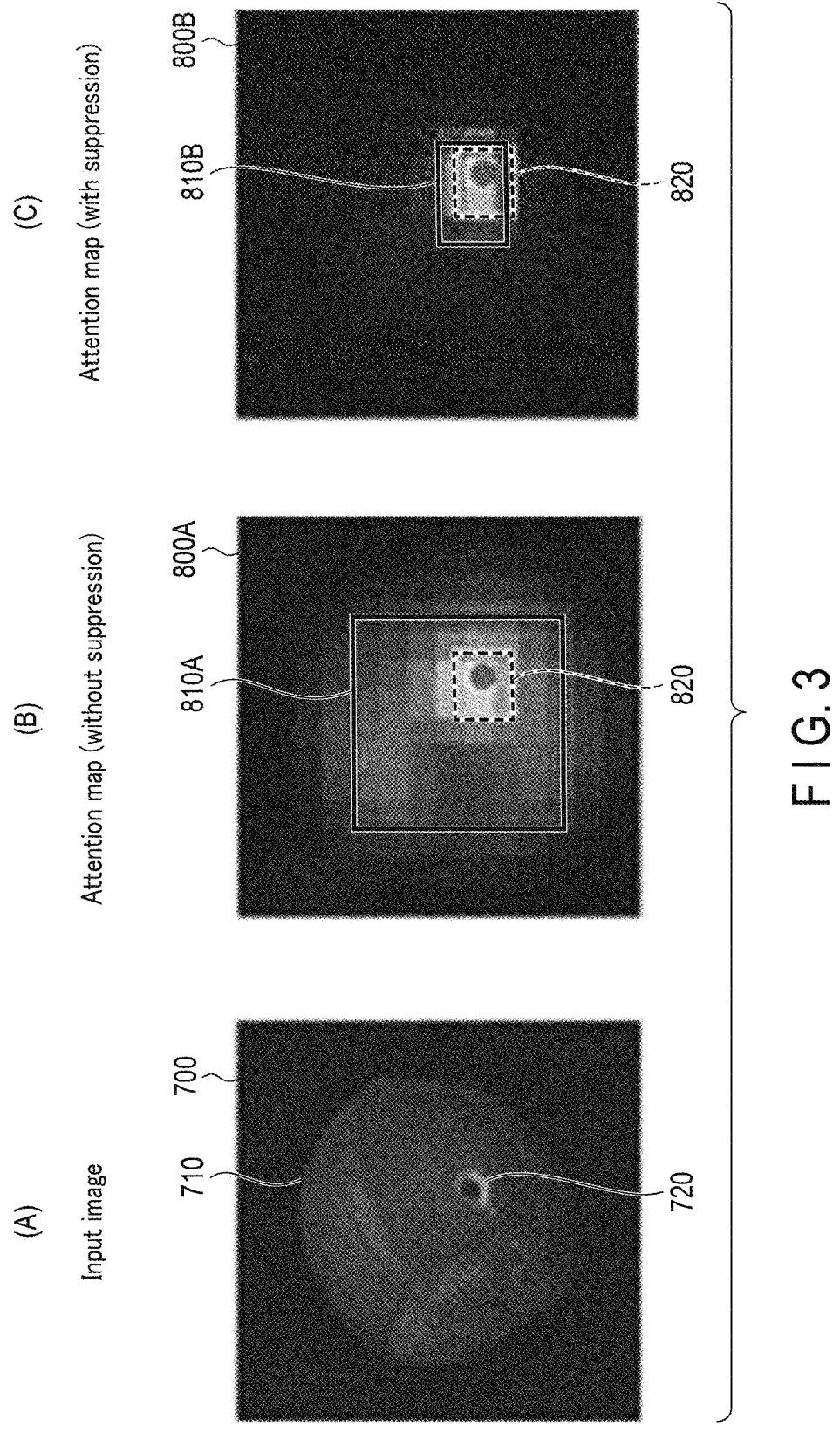
F I G. 3

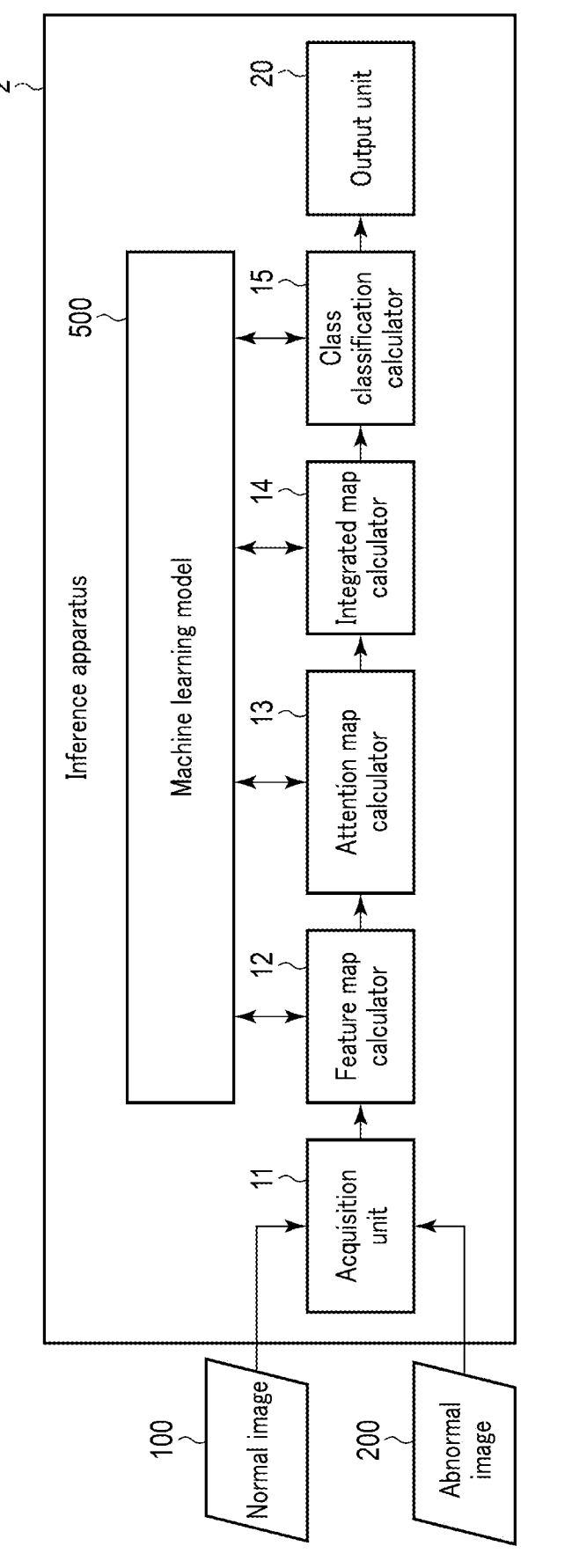
F I G. 4

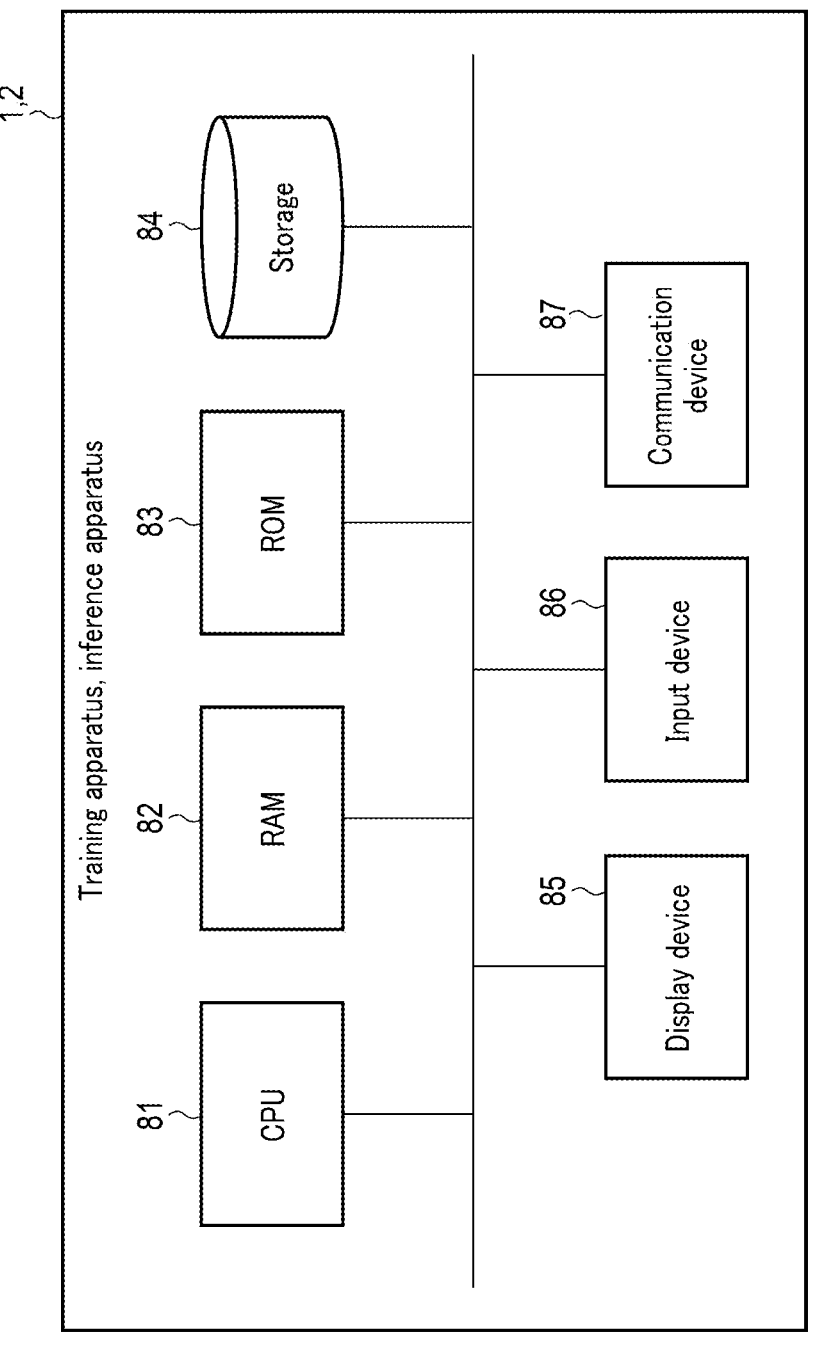
F I G. 5

TRAINING METHOD, APPARATUS AND NON-TRANSITORY COMPUTER READABLE MEDIUM FOR A MACHINE LEARNING MODEL

CROSS-REFERENCE TO RELATED APPLICATION

This application is based upon and claims the benefit of priority from prior Japanese Patent Application No. 2023-027557, filed Feb. 24, 2023, the entire contents of which are incorporated herein by reference.

FIELD

Embodiments described herein relate generally to a training method, apparatus and non-transitory computer readable medium.

BACKGROUND

In technology of object detection, a machine learning model detects an object from an image. Usually, in order to train the machine learning model, training data, to which position information and a label of an object in an image are added, is necessary (supervised learning). However, since the amount of work for generating training data including position information of an object is large, there is proposed a method of training a machine learning model by training data including only a label of an object (weak supervised learning).

In the technology of object detection by weak supervised learning, a machine learning model generates, for example, an attention map that indicates an attention degree for each of pixels in an image, and detects the position of an object from the image, based on the attention map. In particular, there is a case where the position of a defective area of a target is to be detected by a machine learning model. In this case, the machine learning model needs to be trained such that the defective area of the target is emphasized and a normal area of the target is suppressed.

BRIEF DESCRIPTION OF THE DRAWINGS

FIG. 1 is a block diagram illustrating a functional configuration example of a training apparatus according to a first embodiment.

FIG. 2 is a flowchart illustrating an operation example of the training apparatus according to the first embodiment.

FIG. 3 is a view illustrating an example of a processing result of a machine learning model according to the first embodiment.

FIG. 4 is a block diagram illustrating a functional configuration example of an inference apparatus according to a second embodiment.

FIG. 5 is a block diagram illustrating a hardware configuration example of the training apparatus according to the first embodiment or the inference apparatus according to the second embodiment.

DETAILED DESCRIPTION

In general, according to one embodiment, a training method includes a first step, a second step, a third step, a fourth step, a fifth step, and a sixth step. The first step is of computing a first feature map and a first attention map from a first image, and computing a second feature map and a second attention map from a second image, by inputting the first image, which does not include a defective area of a target, and the second image, which includes the defective area of the target, to a machine learning model. The second step is of computing a first loss, based on the first attention map. The third step is of computing an integrated map and a class classification of the target by inputting the second feature map and the second attention map to the machine learning model. The fourth step is of computing a second loss, based on the class classification. The fifth step is of computing a total loss, based on the first loss and the second loss. The sixth step is of updating a parameter of the machine learning model in such a manner as to minimize the total loss.

Hereinafter, referring to the accompanying drawings, a description is given of a training method, apparatus and non-transitory computer readable medium. In the embodiments below, it is assumed that parts denoted by like reference signs perform the same operation, and an overlapping description is omitted unless where necessary.

First Embodiment

FIG. 1 is a block diagram illustrating a functional configuration example of a training apparatus 1 according to a first embodiment. The training apparatus 1 is an apparatus that trains a machine learning model 500 by using training data T. The training apparatus 1 includes an acquisition unit 11, a feature map calculator 12, an attention map calculator 13, an integrated map calculator 14, a class classification calculator 15, a normal loss calculator 16, a classification loss calculator 17, a total loss calculator 18, and an update unit 19. In the description below, the machine learning model 500 is an object detection model composed of a neural network (NW), and detects the position of a defective area (for example, damage, a crack, a hole) of a target (for example, an industrial product, a drug, food) and computes a class classification of the target.

The acquisition unit 11 acquires various data or information. For example, the acquisition unit 11 acquires a normal image 100 and an abnormal image 200 as training data T. The normal image 100 is an image (first image) including no defective area of a target. The abnormal image 200 is an image (second image) including a defective area of the target. In other words, the normal image 100 is an image including only a normal area of a target, and the abnormal image 200 is an image including a normal area and a defective area of the target. A label (correct answer label) of a target may be added to the normal image 100 and abnormal image 200. The acquisition unit 11 transmits the acquired training data T to the feature map calculator 12.

The feature map calculator 12 computes a feature map F by inputting the training data T to the machine learning model 500. The feature map F is a map including characteristic information. The feature map F is obtained by applying a convolution layer or a fully connected layer of the machine learning model 500 to the training data T. In a case where the training data T is an image, the feature map F is expressed by a three-dimensional matrix (i, j, k) including a two-dimensional element (i, j) in a spatial direction and including a one-dimensional element (k) in a channel direction.

Firstly, the feature map calculator 12 computes a first feature map F1 by inputting the normal image 100 to the machine learning model 500. Secondly, the feature map calculator 12 computes a second feature map F2 by inputting the abnormal image 200 to the machine learning model 500.

The feature map calculator 12 sends the computed feature map F to the attention map calculator 13.

The attention map calculator 13 computes an attention map A by inputting the feature map F to the machine learning model 500. The attention map A is a map indicating which part in the spatial direction in the feature map F holds information that is effective for object detection. The attention map A is obtained by applying a convolution layer or a fully connected layer of the machine learning model 500 to the feature map F. In a case where the training data T is an image, the attention map A is expressed by a two-dimensional matrix (i, j) including a two-dimensional element (i, j) in the spatial direction. Specifically, the size in the spatial direction of the feature map F is identical to the size in the spatial direction of the attention map A.

Firstly, the attention map calculator 13 computes a first attention map A1 by inputting the first feature map F1 to the machine learning model 500. Secondly, the attention map calculator 13 computes a second attention map A2 by inputting the second feature map F2 to the machine learning model 500. The attention map calculator 13 sends the computed first attention map A1 to the normal loss calculator 16. On the other hand, the attention map calculator 13 sends the second feature map F2 and the computed second attention map A2 to the integrated map calculator 14. Note that the feature map calculator 12 and attention map calculator 13 are an example of a first map calculator.

The integrated map calculator 14 computes an integrated map G by inputting the second feature map F2 and second attention map A2 to the machine learning model 500. In a case where the training data T is an image, the integrated map G is expressed by a three-dimensional matrix (i, j, k) including a two-dimensional element (i, j) in the spatial direction and including a one-dimensional element (k) in the channel direction. In general, as indicated by equation (1), the integrated map G is computed as a product of a multiplication between the value of each of elements of the feature map F and the value of each of elements of the attention map A.

$$G_{ijk} = F_{ijk} \cdot A_{ij} \tag{1}$$

In equation (1), i and j represent the spatial positions of the feature map F, attention map A and integrated map G. In addition, k represents the channel of the feature map F and integrated map G. The integrated map calculator 14 sends the computed integrated map G to the class classification calculator 15.

The class classification calculator 15 computes a class classification C by inputting the integrated map G to the machine learning model 500. For example, the class classification C is an estimation vector V1 indicating a probability that a target belongs to each of a plurality of classes. The estimation vector V1 can be obtained by applying a convolution layer or a fully connected layer of the machine learning model 500 to the integrated map G. The class classification calculator 15 sends the computed estimation vector V1 to the classification loss calculator 17. Note that the integrated map calculator 14 and class classification calculator 15 are an example of a second map calculator.

The normal loss calculator 16 computes a normal loss $L_{normal}$ (first loss), based on the first attention map A1 that was sent from the attention map calculator 13. In general, as indicated by equation (2), the normal loss $L_{normal}$ is computed as an average value of the attention map A.

$$L_{normal} = \frac{1}{N} \sum_{i,j} A_{ij} \tag{2}$$

In equation (2), i and j represent the spatial position of the attention map A. N represents the number of pixels (number of elements) of the attention map A. The normal loss calculator 16 sends the computed normal loss $L_{normal}$ to the total loss calculator 18.

The classification loss calculator 17 computes a classification loss $L_{classify}$ (second loss), based on the estimation vector V1 sent from the class classification calculator 15. Specifically, the classification loss calculator 17 computes the classification loss $L_{classify}$, based on the estimation vector V1 and a correct answer vector V2. The correct answer vector V2 is a vector including information of a class corresponding to the training data T. For example, in the correct answer vector V2, the dimension of the class corresponding to the training data T is "1", and the dimension of the class not corresponding to the training data T is "0". For example, the classification loss $L_{classify}$ is a cross-entropy loss. The classification loss calculator 17 sends the computed classification loss $L_{classify}$ to the total loss calculator 18.

In the present embodiment, assuming a case where a target can take a plurality of classes, the machine learning model 500 executes class classification of the target. On the other hand, in a case where a target can take a single class, the machine learning model 500 may execute regression. In this case, the classification loss $L_{classify}$ may be a binary cross-entropy loss as a regression loss.

The total loss calculator 18 computes a total loss L, based on the normal loss $L_{normal}$ sent from the normal loss calculator 16 and the classification loss $L_{classify}$ sent from the classification loss calculator 17. For example, the total loss calculator 18 computes the total loss L by adding the normal loss $L_{normal}$ and the classification loss $L_{classify}$ (equation: $L = L_{normal} + L_{classify}$).

Note that, as indicated by equation (3), the total loss calculator 18 may compute the total loss L by multiplying the normal loss $L_{normal}$ by a weight $W_{normal}$, and adding the normal loss $L_{normal}$ multiplied by the weight $W_{normal}$, and the classification loss $L_{classify}$.

$$L = L_{normal} \cdot W_{normal} + L_{classify} \tag{3}$$

In equation (3), by adjusting the weight $W_{normal}$, the total loss calculator 18 can adjust the ease with which a normal area of a target is detected by the machine learning model 500. The total loss calculator 18 sends the computed total loss L to the update unit 19.

The update unit 19 updates a parameter P (for example, a weight of a neural network, a bias) of the machine learning model 500, in such a manner as to minimize the total loss L. For example, the update unit 19 updates the parameter P of the machine learning model 500 by a gradient descent method or an error backpropagation method.

FIG. 2 is a flowchart illustrating an operation example of the training apparatus 1 according to the first embodiment. The present operation example may automatically be started by the training apparatus 1, or may nonautomatically be started in accordance with an instruction from a user (for example, AI engineer) of the training apparatus 1.

(Step S101) To start with, the training apparatus 1 initializes the total loss L. Specifically, the training apparatus 1 initializes, by the update unit 19, the total loss L that is used for updating the parameter P of the machine learning model 500.

(Step S102) Next, the training apparatus 1 acquires a minibatch M. Specifically, the training apparatus 1 acquires, by the acquisition unit 11, a minibatch M of the training data T that is used for training the machine learning model 500. The minibatch M is a subset of data selected from the training data T. For example, the acquisition unit 11 acquires the training data T, generates a plurality of minibatches M from the acquired training data T, and acquires one minibatch M from the generated minibatches M. The acquisition unit 11 may generate minibatches M by randomly selecting a predetermined number of data from the training data T.

(Step S103) Subsequently, the training apparatus 1 acquires a normal image 100 or an abnormal image 200. Specifically, the training apparatus 1 acquires, by the acquisition unit 11, one normal image 100 or one abnormal image 200 from among a plurality of normal images 100 and a plurality of abnormal images 200 included in the minibatch M.

(Step S104) Subsequently, the training apparatus 1 computes a feature map F. Specifically, the training apparatus 1 computes, by the feature map calculator 12, a first feature map F1 from the normal image 100, and a second feature map F2 from the abnormal image 200.

(Step S105) Subsequently, the training apparatus 1 computes an attention map A. Specifically, the training apparatus 1 computes, by the attention map calculator 13, a first attention map A1 from the first feature map F1, and a second attention map A2 from the second feature map F2.

(Step S106) Here, the training apparatus 1 determines whether the image that is a processing target is the normal image 100. Specifically, the training apparatus 1 determines, by the attention map calculator 13, whether the image, which is a target of the sequence of the process relating to step S103 to S105, is the normal image 100. In a case where the image of the processing target is the normal image 100 (step S106—YES), the process advances to step S107. In a case where the image of the processing target is not the normal image 100 (step S106—NO), the process advances to step S108. The latter case corresponds to a case where the image of the processing target is the abnormal image 200.

(Step S107) In this case, the training apparatus 1 computes a normal loss $L_{normal}$. Specifically, the training apparatus 1 computes, by the normal loss calculator 16, the normal loss $L_{normal}$, based on the first attention map A1 computed in step S105. After step S107, the process advances to step S111.

(Step S108) In this case, the training apparatus 1 computes an integrated map G. Specifically, the training apparatus 1 computes, by the integrated map calculator 14, the integrated map G, based on the second feature map F2 computed in step S104, and the second attention map A2 computed in step S105.

(Step S109) Subsequently, the training apparatus 1 computes a class classification C. Specifically, the training apparatus 1 computes, by the class classification calculator 15, the class classification C, based on the integrated map G.

(Step S110) Subsequently, the training apparatus 1 computes a classification loss $L_{classify}$. Specifically, the training apparatus 1 computes, by the classification loss calculator 17, the classification loss $L_{classify}$, based on the class classification C. After step S110, the process advances to step S111.

(Step S111) Subsequently, the training apparatus 1 computes a total loss L. Specifically, the training apparatus 1 computes, by the total loss calculator 18, the total loss L, based on the normal loss $L_{normal}$ computed in step S107 and the classification loss $L_{classify}$ computed in step S110.

(Step S112) Here, the training apparatus 1 determines whether the processing of the minibatch M is completed. Specifically, the training apparatus 1 determines, by the total loss calculator 18, whether the processing is completed in regard to all normal images 100 or abnormal images 200 included in the minibatch M acquired in step S102. In a case where the processing of the minibatch M is completed (step S112—YES), the process advances to step S113. In a case where the processing of the minibatch M is not completed (step S112—NO), the process returns to step S103.

(Step S113) Subsequently, the training apparatus 1 updates the parameter P. Specifically, the training apparatus 1 updates, by the update unit 19, the parameter P of the machine learning model 500 in such a manner as to minimize the total loss L computed in step S111.

(Step S114) Here, the training apparatus 1 determines whether the training is completed. Specifically, the training apparatus 1 determines, by the update unit 19, whether a condition for completing the training of the machine learning model 500 is satisfied. In a case where the condition is satisfied (step S114—YES), the training apparatus 1 terminates the sequence of the process. In a case where the condition is not satisfied (step S114—NO), the process returns to step S101. This condition may be whether the processing is completed in regard to all minibatches M included in the training data T.

FIG. 3 is a view illustrating an example of a processing result of the machine learning model 500 according to the first embodiment. Part (A) of FIG. 3 illustrates an input image 700. Part (B) of FIG. 3 illustrates an attention map 800A that the machine learning model 500 computed from the input image 700 before the training by the training method of FIG. 2. Part (C) of FIG. 3 illustrates an attention map 800B that the machine learning model 500 computed from the input image 700 after the training by the training method of FIG. 2.

A seed 710 appears as a target in the input image 700. In the input image 700, an image area of the seed 710 includes an image area of a wormhole 720. Specifically, an image area excluding the image area of the wormhole 720 from the image area of the seed 710 corresponds to a "normal area" of the seed 710. On the other hand, the image area of the wormhole 720 corresponds to a "defective area" of the seed 710. In short, the input image 700 is an example of the abnormal image 200.

The machine learning model 500 computes the attention map 800A or 800B in order to detect the position of the "defective area" of the seed 710 from the input image 700. The attention map 800A or 800B is a map composed of 15 pixels×15 pixels (the number N of pixels: 225) in the spatial direction. Each pixel is expressed by a black-and-white gray scale in accordance with the probability of the presence of a defect. A pixel closer to white indicates that the probability is higher. A pixel closer to black indicates that the probability is lower.

Based on the attention map 800A or 800B, the machine learning model 500 detects the position of the defective area of the seed 710. The position of the detected defective area is indicated by a box 810A or 810B. On the other hand, the position of the actual defective area existing in the input image 700 is indicated by a box 820. In other words, the box 810A or 810B corresponds to an inference result by the machine learning model 500, and the box 820 corresponds to correct answer data.

According to the attention map 800A, the machine learning model 500 determines the defect is present in an almost entire area of the attention map 800A. Specifically, the machine learning model 500 erroneously detects an image area corresponding to the "normal area" of the seed 710 as an "abnormal area". Thus, the position of the box 810A does not relatively agree with the position of the box 820. In other words, the machine learning model 500 is not trained in such a manner as to suppress the "normal area" of the seed 710 in the attention map 800A.

By contrast, according to the attention map 800B, the machine learning model 500 determines that the defect is present in a limited partial area of the attention map 800B. Specifically, the machine learning model 500 does not erroneously detect an image area corresponding to the "normal area" of the seed 710 as an "abnormal area". Thus, the position of the box 810B relatively agrees with the position of the box 820. In other words, the machine learning model 500 is trained in such a manner as to suppress the "normal area" of the seed 710 in the attention map 800B.

According to the attention maps 800A and 800B, the machine learning model 500 after trained by the training method of FIG. 2, compared to the machine learning model 500 before trained by the training method of FIG. 2, detects the "defective area" of the seed 710 more accurately.

The training apparatus 1 according to the first embodiment has been described above. The training apparatus 1 adds the normal loss $L_{normal}$ based on the normal image 100 and the classification loss $L_{classify}$ based on the abnormal image 200, and updates the parameter P of the machine learning model 500 in such a manner as to minimize the added total loss L. Thereby, the machine learning model 500 is trained in such a manner as to decrease the pixel value of the attention map A corresponding to the "normal area" of the target and to increase the pixel value of the attention map A corresponding to the "defective area" of the target. Accordingly, the machine learning model 500 can detect the defective area of the target more accurately by using the attention map A. In other words, the training apparatus 1 can improve the accuracy of the object detection by the machine learning model 500.

Second Embodiment

FIG. 4 is a block diagram illustrating a functional configuration example of an inference apparatus 2 according to a second embodiment. The inference apparatus 2 is an apparatus that executes inference by using the machine learning model 500 trained by the training apparatus 1. The inference apparatus 2 includes an acquisition unit 11, a feature map calculator 12, an attention map calculator 13, an integrated map calculator 14, a class classification calculator 15, and an output unit 20.

The acquisition unit 11 acquires a normal image 100 or an abnormal image 200 as inference data E. The feature map calculator 12 computes a feature map F by inputting the inference data E to the machine learning model 500. The attention map calculator 13 computes an attention map A by inputting the feature map F to the machine learning model 500. The integrated map calculator 14 computes an integrated map G by inputting the feature map F and attention map A to the machine learning model 500. The class classification calculator 15 computes a class classification C by inputting the integrated map G to the machine learning model 500.

The output unit 20 outputs various data or information. For example, the output unit 20 outputs the attention map A and class classification C. The attention map A indicates the position of a target included in the inference data E. The class classification C indicates the kind of the target included in the inference data E.

The inference apparatus 2 according to the second embodiment has been described above. The inference apparatus 2 executes inference in regard to the inference data E by using the machine learning model 500 trained by the training apparatus 1. Thereby, the inference apparatus 2 can more accurately detect the position and kind of the target included in the inference data E.

FIG. 5 is a block diagram illustrating a hardware configuration example of the training apparatus 1 according to the first embodiment or the inference apparatus 2 according to the second embodiment. The training apparatus 1 or the inference apparatus 2 includes, as structural components, a CPU 81, a RAM 82, a ROM 83, a storage 84, a display device 85, an input device 86 and a communication device 87. These structural components are communicably connected to each other by a bus. Note that the training apparatus 1 or the inference apparatus 2 may include only some of these structural components.

The CPU 81 is a processor that executes various processes (for example, an arithmetic process, a control process) in accordance with programs. The CPU 81 uses a predetermined area of the RAM 82 as a working area. The CPU 81 implements the components (acquisition unit 11, feature map calculator 12, attention map calculator 13, integrated map calculator 14, class classification calculator 15, normal loss calculator 16, classification loss calculator 17, total loss calculator 18, update unit 19 and output unit 20) of the training apparatus 1 or inference apparatus 2 by reading and executing the programs stored in the ROM 83 or storage 84. The CPU 81 is an example of a processing unit.

The RAM 82 is a memory that rewritably stores various data or information. For example, the RAM 82 is an SDRAM (Synchronous Dynamic Random Access Memory). The RAM 82 is an example of a storage unit.

The ROM 83 is a memory that nonrewritably stores various data or information. The ROM 83 is an example of the storage unit.

The storage 84 is a storage medium of any kind (for example, a magnetic storage medium a semiconductor storage medium, an optical storage medium). Alternatively, the storage 84 may be a drive unit that writes or reads various data or information to or from the storage medium. The storage 84 writes or reads various data or information to or from the storage medium, in accordance with the control by the CPU 81. The storage 84 is an example of the storage unit.

The display device 85 is a device that displays various data or information. For example, the display device 85 is an LCD (Liquid Crystal Display). Based on a display signal from the CPU 81, the display device 85 displays various data or information. The display device 85 is an example of a display unit or an output unit.

The input device 86 is a device that inputs various data or information to the training apparatus 1 or inference apparatus 2. For example, the input device 86 is a mouse or a keyboard. The input device 86 accepts, as an instruction signal, information that is input by a user, and sends the instruction signal to the CPU 81. The input device 86 is an example of an input unit.

The communication device 87 communicates with an external device via a network in accordance with the control by the CPU 81. The communication device 87 is an example of a communication unit.

Note that the various processes by the training apparatus 1 or inference apparatus 2 can be executed by a computer (for example, a personal computer, a microcomputer, an arithmetic unit). For example, the computer stores programs corresponding to various processes in a storage medium, and reads and executes the stored programs. Alternatively, the computer reads programs from an external storage medium connected by a network (for example, LAN, Internet), and executes the programs. Thereby, the computer can achieve the same advantageous effects as the advantageous effects by the processing of the training apparatus 1 or inference apparatus 2.

The storage medium may be a magnetic disk (for example, flexible disc, hard disk), an optical disc (for example, CD-ROM, CD-R, CD-RW, DVD-ROM, DVD+R, DVD+RW, Blu-ray (trademark) Disc), a semiconductor memory, or a storage medium similar to these. The storage medium may be a storage medium in which programs are downloaded from a network and stored. Needless to say, a plurality of programs may be stored in a plurality of storage media in a distributed manner.

Besides, instead of a single computer, a main component, such as a system composed of a plurality of computers, an OS (operating system), database management software or MW (middleware) may execute various processes by the training apparatus 1 or inference apparatus 2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A training method comprising:
computing a first feature map and a first attention map from a first image, and computing a second feature map and a second attention map from a second image, by inputting the first image, which does not include a defective area of a target, and the second image, which includes the defective area of the target, to a machine learning model;
computing a first loss, based on the first attention map;
computing a product of a multiplication between a value of each of elements of the second feature map and a value of each of elements of the second attention map as an integrated map by inputting the second feature map and the second attention map to the machine learning model;
computing a class classification of the target by inputting the integrated map to the machine learning model;
computing a second loss, based on the class classification;

computing a total loss, based on the first loss and the second loss; and
updating a parameter of the machine learning model in such a manner as to minimize the total loss.

2. The training method of claim 1, wherein an average value of the first attention map is computed as the first loss.

3. The training method of claim 1, wherein the total loss is computed by multiplying the first loss by a weight, and adding the first loss multiplied by the weight, and the second loss.

4. A training apparatus comprising a processor, the processor being configured to:
compute a first feature map and a first attention map from a first image, and compute a second feature map and a second attention map from a second image, by inputting the first image, which does not include a defective area of a target, and the second image, which includes the defective area of the target, to a machine learning model;
compute a first loss, based on the first attention map;
compute a product of a multiplication between a value of each of elements of the second feature map and a value of each of elements of the second attention map as an integrated map by inputting the second feature map and the second attention map to the machine learning model;
compute a class classification of the target by inputting the integrated map to the machine learning model;
compute a second loss, based on the class classification;
compute a total loss, based on the first loss and the second loss; and
update a parameter of the machine learning model in such a manner as to minimize the total loss.

5. A non-transitory computer readable medium including computer executable instructions, wherein the instructions, when executed by a processor, cause the processor to perform a method comprising:
computing a first feature map and a first attention map from a first image, and computing a second feature map and a second attention map from a second image, by inputting the first image, which does not include a defective area of a target, and the second image, which includes the defective area of the target, to a machine learning model;
computing a first loss, based on the first attention map;
computing a product of a multiplication between a value of each of elements of the second feature map and a value of each of elements of the second attention map as an integrated map by inputting the second feature map and the second attention map to the machine learning model;
computing a class classification of the target by inputting the integrated map to the machine learning model;
computing a second loss, based on the class classification;
computing a total loss, based on the first loss and the second loss; and
updating a parameter of the machine learning model in such a manner as to minimize the total loss.

* * * * *